Sept. 6, 1955     H. P. S. PAISH     2,717,040

WELLPOINTS

Filed Jan. 8, 1952

HAROLD PHILIP SIDNEY PAISH
INVENTOR

United States Patent Office 2,717,040
Patented Sept. 6, 1955

2,717,040

WELLPOINTS

Harold Philip Sidney Paish, Meadowside, Limpsfield, England, assignor to Henry Sykes Limited, London, England, a British company Application January 8, 1952, Serial No. 265,376

Claims priority, application Great Britain January 9, 1951

2 Claims. (Cl. 166—157)

The invention relates to wellpoints useful in the draining of wet subsoils.

The principal object of the invention is to provide a novel construction in which the hydraulic friction of the jetting water or the combined action of such friction and the static pressure of such water effects displacement of an internal water conveying part such that the whole or greater part of the jetting is taken direct to the jetting head while, when suction is applied to the wellpoint, water from the ambient ground enters through perforations in a strainer tube and passes up the internal water-conveying part.

A further object of the invention is to simplify the construction and provide a wellpoint which may be readily taken apart for cleaning and repair and one which may incorporate a readily replaceable inner strainer or filter.

The foregoing and other objects of the invention will be apparent from the following description of one embodiment of wellpoint which is illustrated in the accompaying drawings, which are given for illustration but not limitation and in which.

Figure 2:
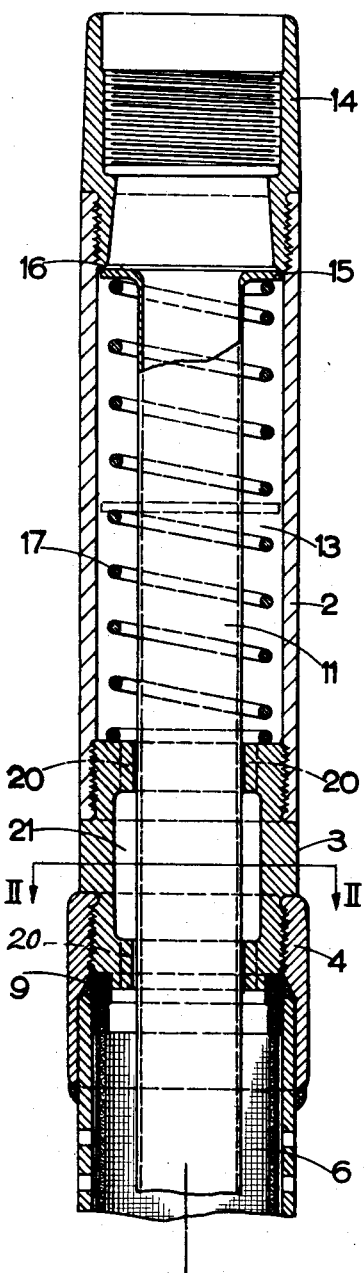
Figure 2 shows a transverse section on the line II—II in Figure 1.
Figure 2:
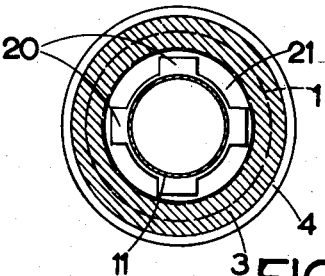

In the construction illustrated in the drawing, the wellpoint comprises, at its lower end, a perforated strainer tube 1 and, at its upper end, an imperforate tube 2, which tubes are connected by a hollow connector member 3 which thus separates the two portions of the strainer tube. The imperforate tube 2 is screwed onto one end of the connector 3, while the perforated strainer tube 1 has a sleeve 4 welded to it or, if desired, formed integrally with it, which sleeve 4 is internally screw-threaded to engage a thread on the connector 3 substantially as shown.

The strainer tube is of robust construction to obviate damage and is conveniently in the form of steel tubing perforated with holes 5 in the portion 1.

Figure 1:
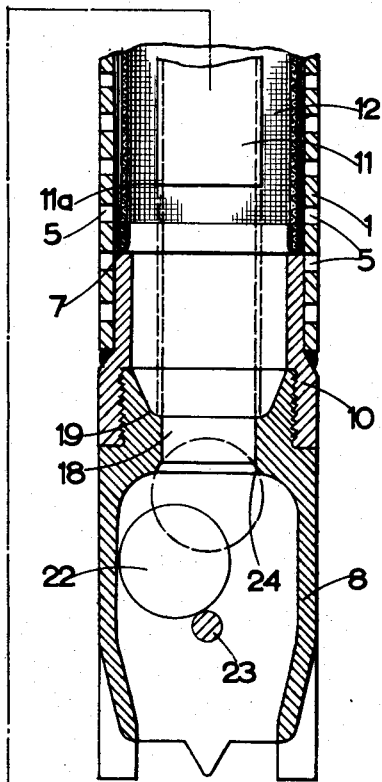
Figure 1 shows the wellpoint in longitudinal section.

Within the perforated portion 1 of the strainer tube is a wire mesh and gauze inner strainer tube 6 which is held between a shoulder 7 on the union 10 and a resilient ring 9 seating against the lower end of the connector 3 (Figure 1).

The jetting head 8, which is of known construction, screws into said union 10 welded to the corresponding end of the strainer portion 1. Freely disposed within the jetting head 8 is a valve ball 22 which is made so that it will float in water, and, fixed across the internal space within the jetting head 8, is a pin 23 which prevents the ball 22 from falling out.

Disposed coaxially within the strainer tube 1, 2 is a solid-walled flow tube 11 of smaller diameter which passes through and is guided for axial movement in the hollow connector 3, being separated from the strainer 1 by an annular space 12, and from the casing 2 by an annular space 13.

At its upper end the imperforate tube or casing 2 has screwed into it a union 14 to which may be connected a hose or other pipe through which jetting water is supplied to the wellpoint, and through which also the water flows out during the de-watering operation.

The upper end of the flow tube 11, is, in the embodiment illustrated, formed with an external flange 15 which has approximately the same diameter as the internal diameter of the tube 2 and is normally held against a seating 16 formed on the lower end of the union member 14 by means of a compression spring 17 disposed between the flange 15 and the uppermost face of the connector 3. The passage 18, leading into the jetting head 8, has the same diameter as the internal diameter of the flow tube 11 and leads into a seating 19 against which the lower end 11a of the flow tube can seat when the flow tube 11 is moved axially in a manner described below, the flow tube 11 terminating above the seating 19 when the flange 15 is in contact with the seating 16 as shown in Figure 1.

When using the device according to the invention, the wellpoint is inserted into the ground in the usual manner, after a hose or other pipe line has been connected to the union 14.

Jetting water is then supplied under pressure through this pipe, and through the union 14 to the interior of the flow pipe 11. At the beginning of the operation, the parts are in the position shown in Figure 1. The jetting water emerges from the lower end of the flow tube 11, some of it passing out through the jetting head 8, while the remainder will at first enter the space 12 surrounding the flow tube 11 and will pass out through the perforations of strainer tube 1. The friction of the water on the internal wall of the tube 11, assisted by the differential or static pressure of water acting on the flange 15, however, forces the flow tube 11 downwardly against the spring 17 until the lower end 11a seats against the seating 19 of the jetting head (as shown in dotted lines in Fig. 1) and acts as a valve to shut off the interior of the flow tube 11 from the space 12 surrounding it so that practically the whole of the jetting water passes straight through the tube 11 and out of the jetting head 8 to effect the jetting operation and does not escape through the perforations in the strainer tube 1.

A small amount will leak past the edge of the flange 15 and also at the seating 19, but these leaks are insufficiently important to necessitate seals being made at these points.

After the jetting operation has been completed, the supply of jetting water is cut off, whereupon the spring 17 returns the tube 11 automatically to its uppermost or first operative limiting position in which the flange 15 again bears or abuts against the seating 16, while the end 11a of the tube 11 is withdrawn from the seating 19.

Suction is then applied to the union 14 through a pipe (not shown) which may be attached to it and water from the ground in which the wellpoint is embedded is sucked in through the strainer tube portion or casing 1 into the space 12 surrounding the flow tube 11. This water cannot pass out directly through the union 14 because the spring 17 is holding flange 15 against the seating 16, which action is assisted by the suction. The water, therefore, passes down the space 12 surrounding the flow tube 11, enters the tube 11 at its lower end, and, having flowed up the tube 11, passes out through the union 14, for discharge to a convenient place through said pipe.

During the de-watering operation, the suction pulls the valve ball 22 forming a non-return valve within the jetting head when in contact with seating 24 (dotted line position in Figure 1) to prevent water from entering the wellpoint directly through the jetting head 8 instead of through the strainer tube. By making the ball 22 so that it will float, the latter rises into light contact with its seating 24 as soon as the jetting water is cut off, so that proper engagement of the ball 22 with its seating 24, when the suction is applied, is assured.

Preferably, the seating 16 for the flange 15 is made slightly conical, while the flange itself is of rectangular section, so that there thus exists line contact between the edge of the flange 15 and its seating 16.

The construction shown in the drawing permits the inner strainer tube 6 to be removed and replaced very easily, since to do so it is only necessary to unscrew the sleeve 4 from the connector 3, thereby removing the whole of the lower part of the wellpoint, including the jetting head without disturbing the flow tube 11 and its spring 17. The inner strainer tube 6 can then be withdrawn upwardly and replaced, and at the same time the resilient ring 9 can be replaced, if worn, after which the lower unit is reconnected, by simply screwing the sleeve 4 again onto the lower end of the connector 3.

In order to prevent pressure from building up in the space 13 between the flow tube 11 and the imperforate tube portion 2 which might hinder the movement of such flow tube under the action of the jetting water, passages 20 and recesses 21 are provided in the connector 3.

The invention is not limited to the embodiment of wellpoint described above as various changes may be made therein without departing from the scope of the appended claims.

I claim:

1. A wellpoint comprising an elongated casing having an annular seat adjacent one end thereof, a perforated strainer tube arranged coaxially with respect to said casing, a connector member arranged for interengaging said casing with one end of said strainer tube, a jetting head disposed at the opposite end of said strainer tube and defining a passageway communicating with said strainer tube, a solid-walled flow tube having a first open end and a second open end and arranged for axial displacement between two operative limiting positions with respect to said jetting head and within said casing and said strainer tube, an annular flange connected to said flow tube adjacent said first end and projecting between said flow tube and said casing interiorly of the latter for cooperative abutment against said annular seat in one of said operative limiting positions of said flow tube, resilient means urging said annular flange to abut against said annular seat and to space said second end of said flow tube from said passageway of said jetting head in said one limiting operative position, thereby permitting passage of water from said second end of said flow tube through said strainer tube, said second end of said flow tube forming means cooperating with said passageway of said jetting head and upon contact with same defining the other operative limiting position of said flow tube for restricting the path of flow of jetting water from said second end of said flow tube only through said jetting head in substantially axial direction thereof.

2. A wellpoint in accordance with claim 1, wherein said resilient means comprises a coil spring disposed circumferentially about said flow tube and extending between said flange and said connector member, said jetting head being provided with valve means to prevent passage of liquid through said jetting head upon return of said flow tube to said one limiting operative position and upon application of suction to said one end of said casing.

References Cited in the file of this patent
UNITED STATES PATENTS

| 203,235 | Young | Apr. 30, 1878 |
| 1,688,356 | Romney | Oct. 23, 1928 |
| 2,007,258 | Singleton | July 9, 1935 |
| 2,093,764 | Lee | Sept. 21, 1937 |
| 2,388,640 | Moore | Nov. 6, 1945 |